H. W. LODER.
CHAIN TIRE GRIP TIGHTENER.
APPLICATION FILED MAR. 3, 1919.

1,404,307.

Patented Jan. 24, 1922.

Inventor
Howard W Loder
By his Attorney
Harry L Duncan

UNITED STATES PATENT OFFICE.

HOWARD W. LODER, OF MONTCLAIR, NEW JERSEY, ASSIGNOR TO AMERICAN CHAIN COMPANY, INCORPORATED, OF BRIDGEPORT, CONNECTICUT, A CORPORATION OF NEW YORK.

CHAIN-TIRE-GRIP TIGHTENER.

1,404,307.  Specification of Letters Patent.  Patented Jan. 24, 1922.

Original application filed November 27, 1917, Serial No. 204,177. Divided and this application filed March 3, 1919. Serial No. 280,244.

*To all whom it may concern:*

Be it known that I, HOWARD W. LODER, formerly a resident of Towaco, county of Morris, State of New Jersey, and now residing at Montclair, Essex County, New Jersey, have made a certain new and useful Invention Relating to Chain-Tire-Grip Tighteners, of which the following is a specification, taken in connection with the accompanying drawing, which forms part of this application, which is a division of my co-pending application 204,177, filed November 27, 1917.

This invention relates especially to tightener or take-up devices adapted for use in connection with chain or other tire grips of the Weed-Parsons type, for instance, and in which a flexible tightener member of chain or the like, preferably having means to adjust its effective length, is loosely connected with a spring hook or securing member which may be releasably connected with one of the side chains of the tire grip. Other hooks or securing members may be arranged on the ends of the tightener chain to be secured to the side chain of the grip or to be looped through the same and adjustably connected to the tightener chain so as to draw inward on the side chain of the grip at three or more separated points and sufficiently tighten or take up the slack therein to prevent undesirable looseness or rattling under running conditions.

Figure 1:
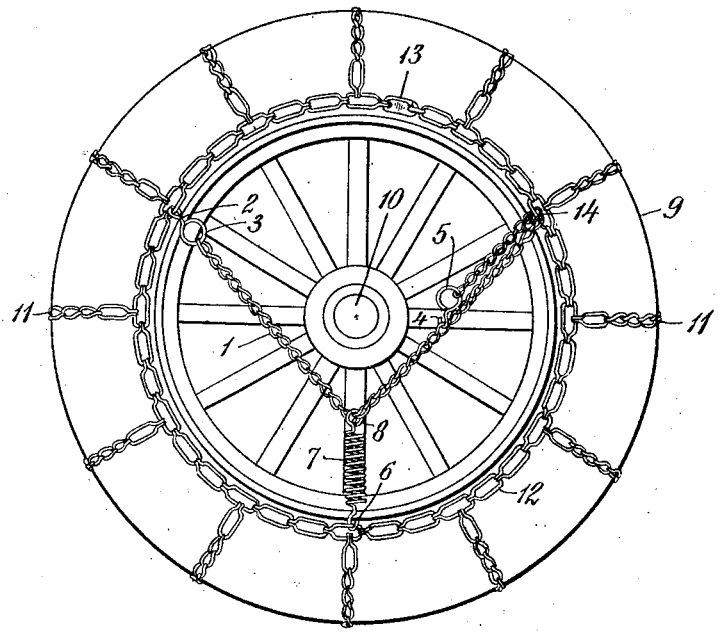
Figure 2:
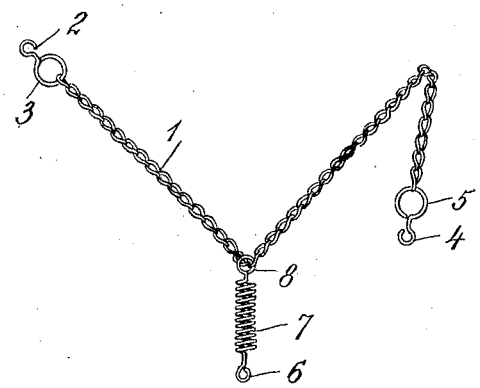

In the accompanying drawing showing in a somewhat diagrammatic way illustrative embodiments of the invention, Fig. 1 shows a chain tire grip with the tightener device applied thereto; and Fig. 2 shows the device before application to the grip.

The tightener device may comprise any suitable flexible tightener, such for instance, as a light chain 1 to which any desired hooks or other securing members may be connected adjacent each of its ends. For example, the hook 2 may be connected as by the ring 3 to one end of this tightener chain, and the hook 4 may be similarly connected to the other end of the chain by the ring 5. Another intermediate hook or securing member of any suitable construction, such as 6, is preferably releasably or movably connected to the intermediate part of the tightener chain, as for instance, by being connected to the eye 8 which is preferably though not necessarily of smaller diameter than the rings 3, 5, so as to prevent the parts being accidentally disconnected. If desired, a spiral or other tightener spring 7 may be interposed between the hook 6 and eye 8 and in some cases these three parts may be conveniently formed of one piece of spring metal which is a cheap and strong construction.

The tightener may be applied to these Parsons-Weed type chain grips or to other tire grips having chain or other flexible side members by fastening the hooks or securing members of the tightener to the side chain or member at separated points and when necessary taking up or adjusting the length of the tightener chain to the extent desired, so that sufficient inward pull is thereby exerted on the side chain at three or more separated points to take up the slack and hold it against undesirable looseness under running conditions. As indicated in Fig. 1 one of the hooks 2 may be secured to the side chain and the intermediate hook 6 may be secured to the side chain at a point, for example, about 120 degrees from the first hook, then the end of the tightener chain may be secured to the side chain at another separated point as by being passed around or looped through one of the links of the side chain and brought back upon itself so as to take up the slack in this tightener chain and form a loop 14 therein, the hook 4 being hooked into the tightener chain at the desired point. In this way the tightener chain is held out of undesirable contact with the hub 10 and draws the side chain inward with substantially uniform tension at three more or less equally separated points so as to hold the cross chains 11 against the tire 9 in the desired way. In some cases the two ends of the tightener may engage the side chain 12 adjacent and on opposite sides of the detachable connection or connector hook 13 and in that event it is in some cases possible to take off the chain grip without disconnecting the tightener therefrom, although this is not usually desirable.

This invention has been described in connection with a number of illustrative embodiments, forms, proportions, parts, materials, arrangements, and methods of manufacture and use, to the details of which disclosure the invention is not of course to be limited, since what is claimed as new and what is desired to be secured by Letters Patent is set forth in the appended claims:

1. A tightener device adapted for use in chain tire grips and comprising a flexible tightener, a hook securing member and a connected attaching device movably engaging the intermediate portion of said tightener, a spiral spring interposed between said hook securing member and attaching device, and a hook securing member secured to each end of said tightener.

2. The tightener device adapted for use on chain tire grips and comprising a flexible tightener, a securing member and a connected attaching device engaging the intermediate portion of said tightener, a spring interposed between said securing member and attaching device, and a securing member secured to each end of said tightener.

3. The tightener device adapted for use on chain tire grips and comprising a flexible inextensible tightener, a securing member and a connected attaching device engaging the intermediate portion of said tightener, a spring interposed between said securing member and attaching device, and a securing member secured to each end of said tightener.

4. The tightener adapted for use on chain tire grips and comprising a flexible inextensible tightener, a securing member connected to the intermediate portion of said tightener, a spring interposed between said securing member and tightener and a securing member secured to each end of said tightener.

5. A tire grip tightener device including a non-resilient flexible chain tightener for engaging the side chain of the tire grip at separated points, and a single tightening spring permanently connected to the intermediate portion of said tightener and having means at one end for connection with the side chain.

6. A tire grip tightener device including a tightener for engaging the side chain of the tire grip at separated points, and a tightening spring connected to the intermediate portion of said tightener and having means for connection with the side chain.

7. A tire chain tightener including non-resilient means for engaging the chain at points spaced apart, and a single spring having means at one end for connection to the chain and at its other end for connection to the first mentioned means between the points the first mentioned means engages the chain, substantially as and for the purpose described.

8. The vehicle wheel having a tire and a chain tire grip thereon and a cooperating tightener connected to a side chain of said grip and comprising a tightener chain, a hook securing member and a connected attaching device engaging the intermediate portion of said tightener chain, a spring interposed between said hook and attaching device, a hook securing member secured to each end of said tightener chain.

9. The vehicle wheel having a tire and a chain tire grip thereon and a cooperating tightener connected to a side chain of said grip and comprising a tightener chain, a securing member and a connected attaching device engaging the intermediate portion of said tightener chain, a spring interposed between said hook and attaching device, a securing member secured to said tightener chain.

10. The tightener device adapted for use in chain tire grips and comprising a flexible tightener, a securing member and a connected attaching device engaging the intermediate portion of said tightener, a spring interposed between said securing member and attaching device, a securing member secured to each end of said tightener.

11. The tightener adapted for use in chain tire grips and comprising a tightener chain, a hook securing member and a connected eye movably engaging the intermediate portion of said tightener chain, a spring interposed between said hook securing member and eye, a hook securing member and a connected ring secured to each end of said tightener chain, said rings being of larger diameter than said eye to prevent the tightener chain being disengaged from said eye.

12. The tightener adapted for use in chain tire grips and comprising a tightener chain, a securing member and a connected eye movably engaging the intermediate portion of said tightener chain, a spring interposed between said securing member and eye, a securing member and a connected ring secured to each end of said tightener chain.

13. The tightener adapted for use in chain tire grips and comprising an adjustable length flexible tightener, a securing member connected to the intermediate portion of said tightener, a spring interposed between said hook securing member and tightener and a securing member secured to each end of said tightener.

HOWARD W. LODER.